3,203,123
MAGNETIC SLIDE TRAY
Olin O. Dominy, Savannah, Ga.
(Rte. 1, Box 221-A, Rincon, Ga.)
Filed Feb. 25, 1963, Ser. No. 260,458
6 Claims. (Cl. 40—78)

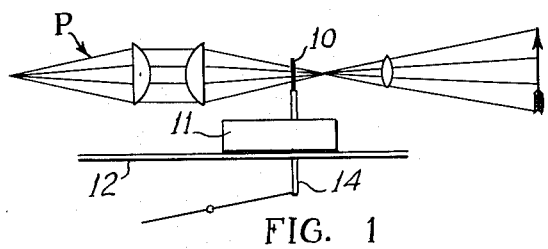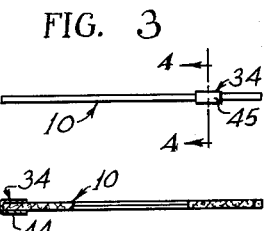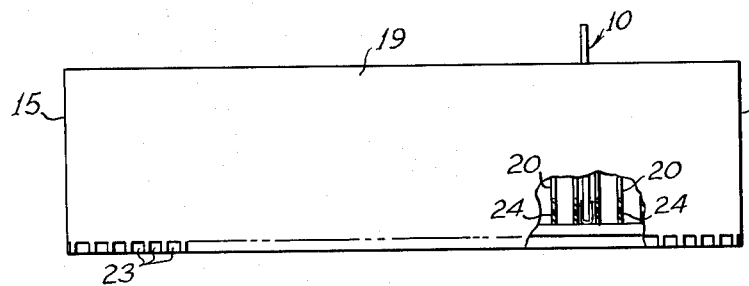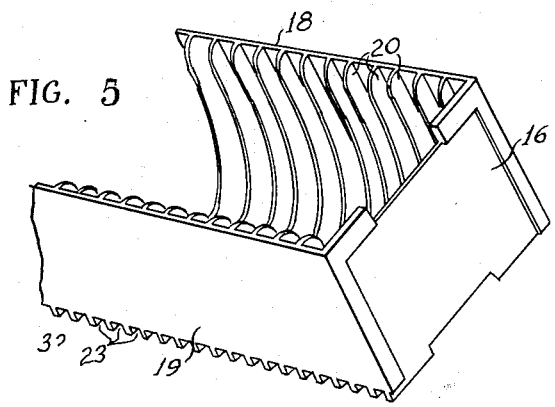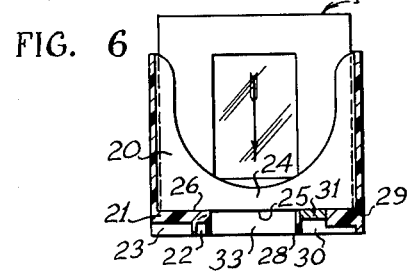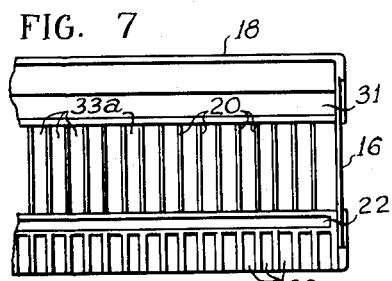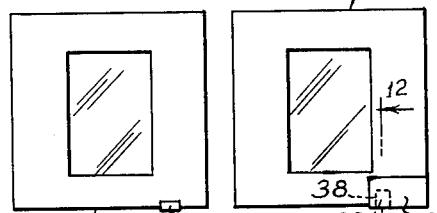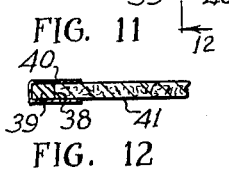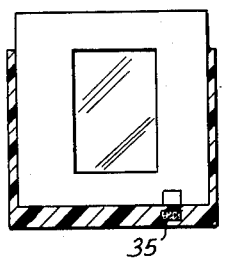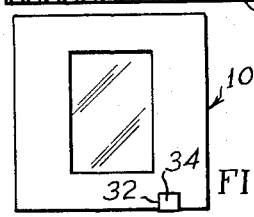
INVENTOR.
Olin O. Dominy
BY
*L. R. Jenkins*
AGENT

United States Patent Office 3,203,123
Patented Aug. 31, 1965

This invention relates to projectors for throwing an image on a screen and more particularly to photographic slides for such projectors and trays and magazines for holding a series of the slides for sequential insertion into a projector.

Trays or magazines for this purpose are well known and generally of two classes, loose holding and friction held. Perhaps the simplest type of the former is essentially an elongated open top box with a series of vertical internal flanges or partition members to receive a slide between adjacent pairs of the members, which slide is loosely held in a nearly vertical plane. A plunger from below the box passing up through a medial longitudinal slot in the bottom of the box can raise successive slides into the projector above as the tray or box is moved longitudinally. In actual practice the tray is more frequently completely or partially turned on its side, and with a corresponding change in direction of motion, during co-action with the projector.

While the above mentioned type of tray is satisfactory and cheap to manufacture, it has no means for retaining the slides in the tray and the slides are often spilled. Moreover slides in popular use are mounted in square cardboard frames, and though the developer marks corners to be visible in good light, the usual practice of marking does not distinguish between "horizontal" and "vertical" pictures.

Friction means for holding the slides in a tray tend to cause wear on the cardboard frame and because of this the second type of magazine has been developed wherein the cardboard slide is permanently placed in a metal frame on which friction means engage. This type of magazine is expensive to manufacture and requires a plunger or hook to force the slide into the magazine during normal use.

An object of the invention is to provide a simple device for adequately retaining slides in trays of the general character where the slides are retained "loose."

Another object of the invention is to provide a slide and tray or magazine of the "loose" retaining type in which the slide will be adequately retained only when the slide is properly oriented in tray.

Still another object of the invention is to provide a slide and tray which will permit easy editing of the contents of a tray and yet provide adequate retention of the slides in the tray.

The above and other objects are attained in connection with a tray having magnetic material at a longitudinal corner of the tray and non-magnetic slides having magnetic material secured to each slide at a corner of the slide to come within the magnetic field of the material of the tray.

In the accompanying drawing showing, by way of example, several of many possible embodiments of the invention.

FIG. 1 is a diagrammatic representation of a projector usable with the tray of the invention;

FIG. 2 is a partially broken side view of the tray;

FIG. 3 is a bottom view of a slide for use in the tray and projector;

FIG. 4 is a transverse sectional view of the slide of FIG. 3 the section being taken along the line 4—4 of FIG. 3 looking in the direction of the arrows of said line;

FIG. 5 is a perspective of the tray;

FIG. 6 is a transverse sectional view of the tray;

FIG. 7 is a bottom view of the tray;

FIG. 8 is a side view of the slide;

FIG. 9 shows a modification of the tray;

FIG. 10 shows a modification of the slide;

FIG. 11 shows another modification of the slide, and

FIG. 12 is a sectional view of the modification of FIG. 11 the section being taken along the line 12—12 of FIG. 11 and looking in the direction of the arrows of said line.

The invention is shown in connection with a projector shown diagrammatically as P wherein a photographic slide 10 is taken from an elongated tray 11 and positioned in the projector. Means (not shown) move the tray longitudinally on a support 12 so that successive slides vertically disposed in the tray may be moved into the focal plane of the projector by conventional means such as a plunger 14 passing through the bottom of the tray. Such a combination is generally old and as such is not a part of the invention.

The magazine or tray 11 is somewhat similar to well-known trays of this type such as have been used in Bell & Howell, Viewlex, and Keystone projectors. The tray has ends 15 and 16 and opposite side wall members 18 and 19 and is made of non-magnetic material such as plastic. Internal vertical flanges or transverse partition members 20 are provided within the tray along the length thereof to hold a plurality of slides 10 substantially vertical, the slides leaning against the members 20. Preferably the partition members extend to and join a horizontal bottom member 21 at a side as shown as 19. A longitudinal under guide-groove 22 in the bottom may be provided in the bottom member and so may be outwardly and downwardly opening notches 23 for engagement with feeding means (not shown) for advancing the tray on the support 12.

A cross portion 24 on each of the partitions 20 and in the lower portion of the tray is preferably provided so that their lower edges 25 lie in the plane of the top face 26 of the bottom member 21. Depending from the partitions at the plane of the face 26 but nearer the side member 18 than to member 19, are a pair of longitudinal projections 28 and 29 forming a longitudinal space 30 therebetween substantially the length of the tray. In this space 30 is disposed a transversely magnetized permanent magnet 31 extending preferably as high as the plane of the edges 25. The botto mmember 21 is provided with a medial longitudinal slot 33 so that a plurality of transverse slits 33a between the partition members are provided for the plunger 14.

The slides for use with the tray may be the popular square cardboard frame slides. Near, but preferably not at, the appropriate corner as at 32, a clip 34 of magnetic material is squeezed or clamped on the slide to register with the magnet when the slide is in proper position in the tray. The securing of the clip is done after correct orientation and facing have been determined and it is contemplated that the clip remain permanently on the slide in correct position. The slide then is held against spillage in casual handling of the tray but not with such sufficient force that it cannot be ejected by ordinary feeding means to the projector.

By locating the clip 34, or other magnetic object mentioned later, away from a corner and from the mid-portion of a slide edge, and having the magnet 31 to register with it, the slide will be magnetically retained only in the one proper position of orientation and facing. Seven improper positionings are possible.

The selective holding action is of particular help in loading a tray in poor light and by a far sighted operator of the projector. The tray may be inverted, when only improperly positioned slides fall out, to determine if the loading has been correct. This is of special benefit in the case of "vertical" pictures.

Moreover magnetic retention enables editing and the rapid variations of selections in a tray without the need for complete metal frames.

For the specific embodiment that has been found satisfactory for both retention and operation in a commerical projector, the magnet 31 was a Plastiform magnet ¼ inch wide and ⅛ inch thick manufactured by Leyman Corporation, Cincinnati, Ohio, and of rubbery characteristics. It is described as a rubber bonded barium ferrite ($BaFe_{12}O_{19}$) composite magnet, having residual induction of 2,100 gauss; coercive force 1,300 oersteds, among other magnetic properties, and heat distortion temperature of 170° @ 66 p.s.i. and maximum operating temperature of 200° F. This composition is well known and no difficulty was encountered in obtaining the magnet in the trade. The rubbery magnet was secured in the space 30 by adhesive although by proper sizing, the magnet may be merely packed or wedged in the space between the projections and retained due to its elastic and frictional properties. By suitable molding processes known to the art, the magnet may be formed as an integral plastic part of the tray with barium, lead or strotium ferrite powder embedded in such a part and transversely magnetized after molding of the tray.

The clip 34 used was about ¼ inch wide and of sheet iron or steel about 0.008 inch thick. The described magnet was sufficiently strong so that when the tray was inverted and lowered over a nearly vertical popular 2 inch x 2 inch cardboard mounted slide and the magnet came down to within about 1/16 inch of the clip, the slide was drawn up into the tray. Appreciable deliberate shaking of the inverted tray substantially filled with slides was necessary to shake any slide loose.

While the thickness of the clip did not interfere with the normal feed from the tray to the projector, other means than the clip may be used as the slide armature. For example, an adhesive containing magnetic material, such as iron or barium ferrite powder may be applied to the edge 37 as at 36 near a corner. The selection of the type of slide armature may probably depend more on the various forms of projectors and feed mechanisms therefor than anything else. One other form and its attachment are shown in FIGS. 11 and 12 wherein the slide 10a is provided at its edge with a notch 38 and the armature piece 39 is shaped to fit into the notch and is held in place by a fold-over tab 40 of paper adhered to opposite faces 40 and 41 of the slide. The armature may be permanently secured to the tab, as by epoxy resin, before the tab is secured to the slide faces. Alternatively, the piece 39 may be strongly magnetic and the magnet 31 very weak as of iron—although both may be strong. A side leg 44 of the clip 34 may be omitted from the edge part 45 and the remainder held in place by a fold-over such as 40.

The shown structure of the lower portions of the tray, except for the mounting of the magnet in a position where the clip may come into effective range of the field or other mentioned magnetic holding means, may be varied since part of the structural features such as the provision of slots 23 are for co-action with the projector. These features were set forth however to show that the invention is applicable to well-known trays by only slight modification.

The invention claimed is:

1. In combination, an elongated photographic slide tray having an open top and vertical partitioning members transverse in the tray; substantially non-magnetic substantially loose slides in the tray and leaning on and between the partitioning members; the tray having a bottom provided with transverse slits between the members for the admission of a plunger; magnetic material near but spaced from a longitudinal bottom corner edge portion of the elongated tray and adjacent each partitioning member; and magnetic means secured on each slide and substantially at an edge of each of said slides and substantially registering with said material near said corner only when the slides are in predetermined facing and orientation in the tray.

2. In a combination as claimed in claim 1 said materials being mutually magnetically strong enough with respect to each slide to prevent falling of the slides from the tray when the tray is turned with its open top down, the slides will be retained by magnetic action due to the registering of the two means.

3. In combination, an elongated photographic slide tray having a slitted bottom and an open top end with vertical spaced transverse partition members; non-magnetic slides loosely disposed between the respective members; each slide being provided with an element of magnetic material remote from a corner and the mid-point of an edge and secured to the slide substantially at an edge thereof, all said elements being substantially alined along a line parallel with the longitudinal axis of and in the tray; and a transversely magnetized permanent magnet fast with respect to the tray at the bottom thereof adjacent said elements to hold the slides in the tray when slides are disposed in the tray with the elements alined.

4. In a combination as claimed in claim 3 said element being of sheet metal having an edge part at the slide edge and at least one leg secured along a face of the slide.

5. In a combination as claimed in claim 3 and a fold-over sheet of non-magnetic material adhered to both faces of the slide serving for the securement of the element on the slide.

6. In a combination as claimed in claim 3, said tray being of plastic and the bottom of the tray having depending longitudinal flanges, said magnet being a composite magnet of yieldable material and secured to the tray between the flanges.

References Cited by the Examiner

UNITED STATES PATENTS

| 1,317,392 | 9/19 | Ringler | 129—16.5 |
| 1,340,384 | 5/20 | Downing | 129—16.1 |
| 2,900,074 | 8/59 | Windman | 40—79 X |
| 2,959,832 | 11/60 | Baermann | 40—142 |
| 2,999,424 | 9/61 | McCammon | 284—206 X |

FOREIGN PATENTS

| 117,080 | 3/30 | Australia. |
| 631,466 | 11/49 | Great Britain. |
| 905,606 | 3/54 | Germany. |

EUGENE R. CAPOZIO, *Primary Examiner.*

JEROME SCHNALL, LEONARD W. VARNER, JR., *Examiners.*